United States Patent
Lee et al.

(10) Patent No.: US 6,945,065 B2
(45) Date of Patent: Sep. 20, 2005

(54) COOLING/HEATING SYSTEM OF AIR CONDITIONER

(75) Inventors: Won Hee Lee, Seoul (KR); Yoon Jei Hwang, Seoul (KR); Chan Ho Song, Gwacheon-si (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 10/695,904

(22) Filed: Oct. 30, 2003

(65) Prior Publication Data

US 2004/0134212 A1 Jul. 15, 2004

(30) Foreign Application Priority Data

Jan. 14, 2003 (KR) .................................. 10-2003-0002451

(51) Int. Cl.[7] .............................................. F25D 23/00
(52) U.S. Cl. ............................. 62/271; 62/93; 62/309; 165/45
(58) Field of Search ........................... 62/93, 171, 271, 62/275, 309, 310; 165/42

(56) References Cited

U.S. PATENT DOCUMENTS

| | | | | |
|---|---|---|---|---|
| 3,977,466 A | * | 8/1976 | Johansson | 165/285 |
| 4,002,040 A | * | 1/1977 | Munters et al. | 62/121 |
| 5,052,918 A | * | 10/1991 | Fassbinder | 431/7 |
| 5,373,704 A | * | 12/1994 | McFadden | 62/94 |
| 5,419,388 A | * | 5/1995 | Hickel et al. | 165/9.3 |
| 5,423,187 A | * | 6/1995 | Fournier | 62/94 |
| 5,453,223 A | * | 9/1995 | Maisotsenko | 261/153 |
| 6,029,467 A | * | 2/2000 | Moratalla | 62/271 |

* cited by examiner

Primary Examiner—Melvin Jones
(74) Attorney, Agent, or Firm—Greenblum & Bernstein, P.L.C.

(57) ABSTRACT

Cooling/heating system of air conditioner including a duct having a first passage for drawing external air, and a second passage for drawing room air, the second passage having a part crossed with the first passage, a regenerative heat exchanger having first and second flow passages in the crossed part of the first and second passages for indirect heat exchange between the external air and the room air, a case connected to the first and second passages of the duct having first and second outlets for drawing/discharging external and room air, first and second fans for drawing in the external air and the room air into the case through the first and second passages, and discharging the external air and the room air through the first and second outlets, and first and second heat exchangers for heat exchange with the external air and the room air discharge through the first and second outlets, thereby preventing contamination and dried room air and reducing heat loss to permit cooling/heating even with small amount of energy.

18 Claims, 3 Drawing Sheets

COOLING/HEATING SYSTEM OF AIR CONDITIONER

This application claims the benefit of the Korean Application No. P2003-0002451 filed on Jan. 14, 2003, which is hereby incorporated by reference.

BACKGROUND OF THE INVENTION

1. Field of the Invention

The present invention relates to cooling/heating systems of air conditioner, more particularly, to a cooling/heating systems of air conditioner having cooling/heating functions, a ventilation function, humidifying and dehumidifying functions.

2. Background of Related Art

In general, the air conditioner cools or heats a room as a working fluid therein undergoes a phase change to absorb or discharge heat from/to an environment. A related art cooling/heating system of air conditioner will be described with reference to the attached drawings. FIG. 1 illustrates a diagram of the related art cooling/heating system of air conditioner.

Referring to FIG. 1, the related art cooling/heating system of air conditioner is provided with a compressor 1, a four way valve 2, an outdoor heat exchanger, an indoor heat exchanger 4, and an expansion device 5. There are an outdoor fan 3a adjacent to the outdoor heat exchanger 3, and an indoor fan 4a adjacent to the indoor heat exchanger 4. The cooling/heating system of air conditioner makes the refrigerant flow to one side or the other side by controlling the four way valve 2 under the control of a controller, for cooling or heating the room.

A case of cooling of the room with the cooling/heating system of air conditioner will be described.

High temperature, and high pressure refrigerant compressed at the compressor 1 flows from the compressor 1 to the outdoor heat exchanger 3 as the four way valve 2 is controlled, heat exchanges with external air, and condensed at the outdoor heat exchanger 3 as the outdoor fan 3a rotates, and, therefrom, provided to the expansion device 5. The low temperature and low pressure refrigerant expanded at the expansion device 5 heat exchanges at the indoor heat exchangers with room air, and, therefrom, provided to the compressor 1, again. In the instance, room air passes through, and is cooled down at the indoor heat exchanger 4 as the indoor fan 4a rotates, and is discharged to the room again, to cool the room to be at a fixed temperature.

Next, a case of heating of the room with the cooling/heating system of air conditioner will be described.

High temperature, and high pressure refrigerant compressed at the compressor 1 is provided from the compressor 1 to the indoor heat exchanger 4 as the four way valve 2 is controlled, such that the indoor heat exchanger 4 has a high temperature refrigerant flowing therethrough. In this instance, the room air passes through the indoor heat exchanger 4, and is heated as the indoor fan 4a rotates, and is discharged into the room again, to heat the room to be at a fixed temperature.

Then, the refrigerant condensed at the indoor heat exchanger 4 is provided to the expansion device 5, expanded to low temperature and low pressure refrigerant at the expansion device 5, heat exchanges with external air at the outdoor heat exchanger 3, and provided to the compressor 1, again.

Thus, by repeating the foregoing process, the related art cooling/heating system of air conditioner, the room is cooled or heated to be at a fixed temperature selected by the user. However, because the cooling/heating system of air conditioner cools or heats room air and circulates through the room repeatedly, if the cooling/heating operation is continued for a long time, the room air is contaminated and dried.

When the room air is contaminated or dried, users feel unpleasant, and open a window to ventilate the room. In this instance, as the room air at a temperature is discharged to outside of the room, there is a substantial energy, to require cooling or heating to the fixed temperature again, to increase power consumption.

SUMMARY OF THE INVENTION

Accordingly, the present invention is directed to a cooling/heating system of air conditioner that substantially obviates one or more of the problems due to limitations and disadvantages of the related art.

An object of the present invention is to provide a cooling/heating systems of air conditioner, in which an external air is made to be introduced into a room at a predetermined temperature and humidity in cooling or heating the room for preventing room air from being contaminated or dried.

Another object of the present invention is to provide a cooling/heating system of air conditioner, which enable cooling/heating even with small energy by reducing thermal loss.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the cooling/heating system of air conditioner includes a duct having a first passage for drawing external air, and a second passage for drawing room air, the second passage having a part crossed with the first passage, a regenerative heat exchanger having first and second flow passages in the crossed part of the first and second passages for indirect heat exchange between the external air and the room air, a case connected to the first and second passages of the duct having first and second outlets for drawing/discharging external and room air, first and second fans for drawing in the external air and the room air into the case through the first and second passages, and discharging the external air and the room air through the first and second outlets, and first and second heat exchangers for heat exchange with the external air and the room air discharge through the first and second outlets.

The regenerative heat exchanger includes the first flow passages and the second flow passages stacked alternately, and the first and second flow passages are formed of aluminum.

The regenerative heat exchanger includes a plurality of corrugated plates stacked to cross each other alternately to form the first flow passages and the second flow passages, and a flat plate between adjacent corrugated plates for separating the first and second flow passages. The first flow passage is in communication with the first passage, and the second flow passage is in communication with the second passage.

The first and second fans are mounted between respective passages and outlets, and mounted in the case. The first and second heat exchangers of the heat pump system are mounted opposite to the first and second outlets of the case.

The case includes first and second spaces formed therein divided with a semipermeable membrane for permeation of moisture only, the first and second spaces being filled with desiccant, and first and second pumping system connected between upper parts and lower parts of the spaces for pumping the desiccant to the upper parts of the spaces, respectively. The desiccant is silica gel, and the first and second pumping systems are mounted so as to be respectively in contact with the first and second heat exchangers thermally.

The first and second pumping systems include first and second pipelines connected between the upper parts and lower parts of the first and second spaces to form flow passages of the desiccant and to be in contact with the first and second heat exchangers thermally, and first and second pumps on respective pipelines for pumping the desiccant to the upper parts.

The first and second pumping systems are mounted on upper parts of the first and second pipelines.

The first space is in communication with the first passage for drawing the external air, and the second space is in communication with the second passage for drawing the room air.

The first and second outlets are formed, and the first and second passages of the duct are connected to parts, above the level of the desiccant filled in the first and second spaces, and the first and second fans are mounted between the first and second passages of the duct and the first and second outlets.

Preferably, even in a case the first and second spaces are formed in the case, the regenerative heat exchanger includes the first flow passages and the second flow passages stacked alternately. More preferably, the regenerative heat exchanger includes a plurality of corrugated plates stacked to cross each other alternately to form the first flow passages and the second flow passages, and a flat plate between adjacent corrugated plates for separating the first and second flow passages. The first flow passage is in communication with the first passage, and the second flow passage is in communication with the second passage.

The first and second heat exchangers of the heat pump system are mounted opposite to the first and second outlets of the case.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Figure 1:
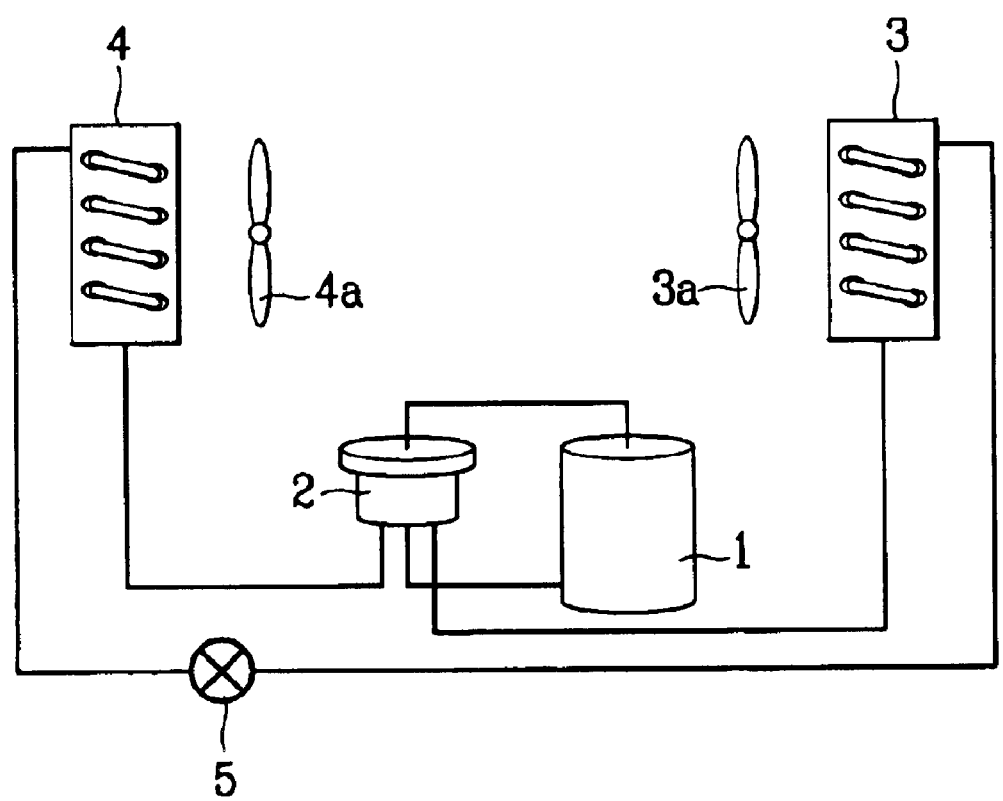
FIG. 1 illustrates a diagram showing a related art cooling/heating system of air conditioner.
Figure 2:
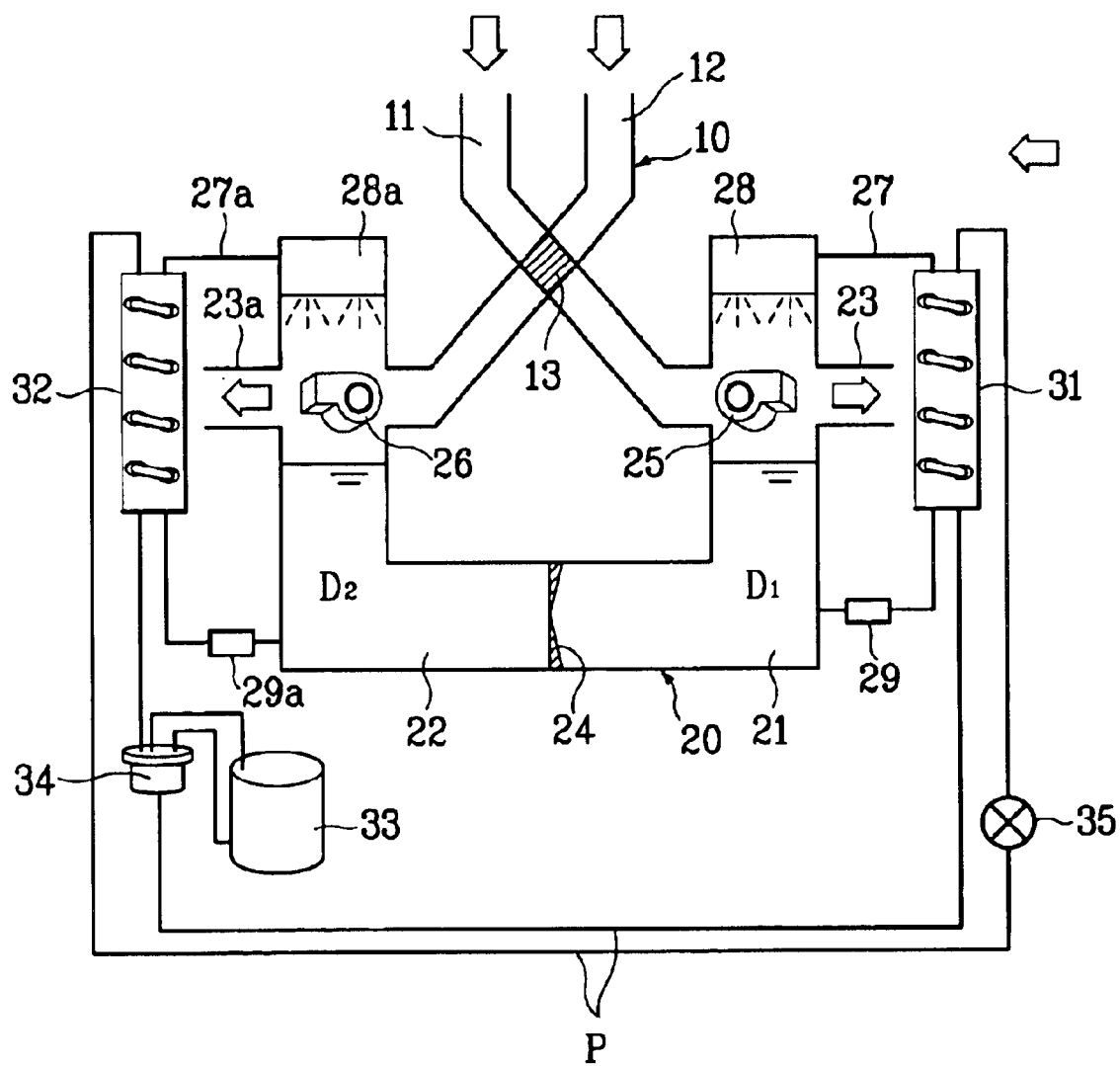
FIG. 2 illustrates a diagram showing a cooling/heating system of air conditioner in accordance with a preferred embodiment of the present invention.

Reference will now be made in detail to the preferred embodiments of the present invention, examples of which are illustrated in the accompanying drawings. In describing the embodiment, same parts will be given the same names and reference symbols, and repetitive description of which will be omitted. FIG. 2 illustrates a diagram showing a cooling/heating system of air conditioner in accordance with a preferred embodiment of the present invention.

Referring to FIG. 2, the cooling/heating system of air conditioner includes a duct 10, a regenerative heat exchanger 13, a case 20, first and second fans 25 and 26, and a heat pump system.

The duct 10 includes a first passage 11 for drawing external air, and a second passage 12 for drawing room air. The first passage 11 and the second passage cross for certain portions, where the regenerative heat exchanger 13 is mounted. The regenerative includes first and second flow passages 14 and 15 for respective pass and indirect heat exchange of the room air and the external air. In this instance, the first and second flow passages 14 and 15 in the regenerative heat exchanger 13 are stacked to for a plurality of layers of the first and second flow passages 14 and 15.

Figure 3:
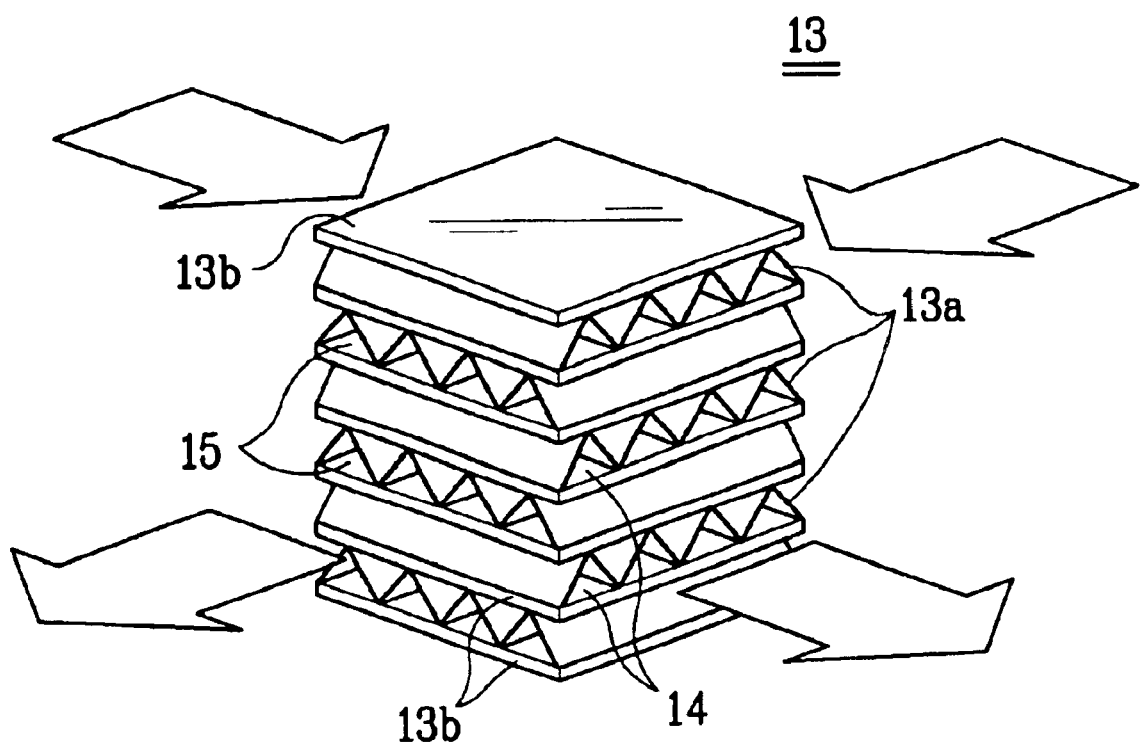
FIG. 3 illustrates a perspective view of a regenerative heat exchanger in the cooling/heating system of air conditioner in FIG. 2.

Moreover, referring to FIG. 3, it is more preferable that the regenerative heat exchanger 13 includes layers of the first and second flow passages 14 and 15, stacked alternately. In this instance, the regenerative heat exchanger 13 includes a plurality of corrugated plates 13a stacked to cross each other, and a plurality of flat plates 13b between adjacent corrugated plates 13a for separating the first and second flow passages 14 and 15.

This structure increases heat exchanger area of the room air and external air passing through the first and second flow passages 14 and 15 to enable better heat exchange compared to a case each of the flow passages 14 and 15 is unity. The first flow passage 14 is in communication with the first passage 11 the external air is drawn therethrough, and the second flow passage 15 is in communication with the second passage 12 the room air is drawn therethrough. The first and second flow passages 14 and 15 may be fabricated of aluminum or copper taking heat transfer and price into account.

In the meantime, the case 20, respectively connected to the first and second passages 11 and 12, receives the room air and the external air drawn through the first and second passages 11 and 12. There are the first and second fans 25 and 26 between the passages 11 and 12 of the duct 10 and outlets 23 and 23a, respectively. The fans 25 and 26 discharge the air drawn through the passages to an outside of the case 20 through the outlets 23 and 23a.

The air from the first and second outlets 23 and 23a of the case 20 is heat exchanged by the heat pump system. The heat pump system includes a compressor 33, a four way valve 34, first and second heat exchangers 31 and 32, and an expansion device 35.

The heat pump system will be described in more detail. The first and second heat exchangers 31 and 32 are mounted opposite to the outlets 23 and 23a of the case 20 respectively, for heat exchanging the air discharged from the first and second outlets 23 and 23a. The compressor 33, the four way valve 34, and the expansion device 35 are mounted on refrigerant pipelines 'P' connected to the first and second heat exchangers 31 and 32. As the compressor 33, the four way valve 34, and the expansion device 35 are identical to the related art, description of which will be omitted.

In the meantime, additionally, there is a semipermeable membrane 24 in the case 20 for permeation of moisture only. The semipermeable membrane 24 divides a space in the case 20 in communication with the first and second passages 11 and 12 into first and second spaces 21 and 22. The first space 21 is in communication with the first passage 11 the external air is drawn therethrough, and the second space 22 is in communication with the second passage 12 the external air is drawn therethrough. The first and second outlets 23 and 23a are also formed in the spaces 21 and 23, respectively.

There is liquid desiccant D1 and D2 in the first and second spaces 21 and 22. The desiccant absorbs or discharges moisture depending on a temperature. The desiccant D1 and D2 is mostly silica gel.

Thus, if the desiccant is filled in the first and second spaces, the outlets 23 and 23a are formed above a level of the desiccant D1 and D2. The passages 11 and 12 are connected to parts of the space over the level of the desiccant D1 and D2.

Upper parts and lower parts of the first and second spaces 21 and 22 are respectively connected with first and second pumping devices for pumping the desiccant D1 and D2 to the upper parts to bring into contact with air. It is preferable that the pumping devices are mounted so as to be in contact with the first and second heat exchangers 31 and 32, thermally.

Referring to FIG. 2, the first or second pumping device includes a first or second pipeline 27 or 27a for connecting the upper and lower part of the first or second space 21 or 22, and first or second pump 29 or 29a mounted on the pipeline 27 or 27a. The first or second pipeline 27 or 27a forms a desiccant D1 or D2 flow passage, and brings the desiccant D1 or D2 into contact with the first or second heat exchangers 31 or 32, thermally. The pumps 29 and 29a, mounted on the pipelines 27 and 27a, pump the desiccant D1 and D2 to the upper parts respectively.

It is preferable that the first and second pumping devices includes first and second spray nozzles 28 and 28a in the upper part of the pipelines 27 and 27a for spraying the desiccant D1 and D2 into air, additionally.

The foregoing cooling/heating system of air conditioner is operative in a ventilation and cooling/heating mode, or a dedicated ventilation mode. The ventilation and cooling/heating mode of the air conditioner will be described.

The cooling/heating system of air conditioner is operated in a ventilation and cooling mode in a hot summer day according to user's selection. The refrigerant in the heat pump system flows in an order of the compressor 33, the second heat exchanger 32, the expansion device 35, and the first heat exchanger 31. Therefore, the first heat exchanger 31 serves as an evaporator, and the second heat exchanger 32 serves as a condenser.

As the first and second fans 25 and 26 are put into operation, the external air drawn into the first passage 11 is introduced into the first space 221 via the first flow passage 14 of the regenerative heat exchanger 13, and the room air drawn into the second passage 12 is introduced into the second space 22 via the second flow passage 15 of the regenerative heat exchanger 13.

In this instance, the external air and the room air heat exchange indirectly at the regenerative heat exchanger 13. Therefore, a portion of thermal energy can be recovered from the room air.

Then, the first pumping system pumps the desiccant D1 to the upper part of he first space 21, and sprays into the room air in the first space 21. In this instance, the desiccant D1 is cooled at the first heat exchanger 31 in contact with the first pipeline 27 thermally during the desiccant D1 passes through the first pipeline 27. Since the desiccant sprayed thus is cooled down to be in a low temperature state, the desiccant absorbs moisture from the external air during the desiccant falls down to the lower part.

Thus, though the desiccant D1 of the first space 21 absorbs the moisture from, and heat exchanges with the external air so as to be heated slightly, the desiccant D1 is cooled down at the first heat exchanger 31 again. By repeating the foregoing process, dry external air can be provided to the first heat exchanger 31.

The dry external air passes through, and cooled at the first heat exchanger 31, discharged into the room, and cools down the room to be at a fixed temperature.

On the other hand, the moisture absorbed in the desiccant D1 passes through the semipermeable membrane 24 to enter into the second space 22. Then the second pumping system pumps the desiccant D2 to the upper part of the second space 22, and sprays into the room air in the second space 22. In this instance, the desiccant D2 is heated at the second heat exchanger 32 in contact with the second pipeline 27a thermally during the desiccant D2 passes through the second pipeline 27a. Since the desiccant sprayed thus is heated up to be in a high temperature state, the desiccant discharges moisture absorbed from the external air during the desiccant falls down to the lower part.

Thus, though the desiccant D2 of the second space 22 discharges the moisture into, and heat exchanges with the room air so as to be cooled slightly, the desiccant D2 is heated up at the second heat exchanger 32 again. By repeating the foregoing process, wet room air can be provided to, and cools down the second heat exchanger 32.

Thus, when the cooling/heating system of air conditioner is operated in the ventilation and cooling mode, dry cold air is discharge to the room, and the room is ventilated as the external air is discharged into the room.

Opposite to this, the cooling/heating system of air conditioner is operated in a ventilation and heating mode in a cold winter day according to user's selection. In this case too, the first and second fans 25 and 26, first and second pumping systems, and the heat pump system are operated.

The refrigerant in the heat pump system flows in an order of the compressor 33, the first heat exchanger 31, the expansion device 35, and the second heat exchanger 32. Therefore, different from the ventilation and cooling mode, the first heat exchanger 31 serves as a condenser, and the second heat exchanger 32 serves as an evaporator.

As the first and second fans 25 and 26 are put into operation, the external air drawn into the first passage 11, and the room air drawn into the second passage 12 heat exchange indirectly at the regenerative heat exchanger 13. Therefore, a portion of thermal energy can be recovered from the room air. The heat exchanged air is introduced into the first and second spaces 21 and 22, respectively.

Then, the first pumping system pumps the desiccant D1 to the upper part of the first space 21, and sprays into the external air in the first space 21. In this instance, the desiccant D1 is heated at the first heat exchanger 31 in contact with the first pipeline 27 thermally during the desiccant D1 passes through the first pipeline 27. Since the desiccant sprayed thus is heated up to be in a high temperature state, the desiccant discharges moisture into the external air during the desiccant falls down to the lower part.

Thus, though the desiccant D1 of the first space 21 discharges the moisture into the external air so as to be cooled slightly, the desiccant D1 is heated up at the first heat exchanger 31 again. By repeating the foregoing process, wet air can be provided to the first heat exchanger 31. The wet air passes through, and heated at the first heat exchanger 31, discharged into the room, and heats and humidifies the room.

On the other hand, the second pumping system pumps the desiccant D2 to the upper part of the second space 22, and sprays into the room air in the second space 22. In this instance, the desiccant D2 is cooled at the second heat exchanger 32 during the desiccant D2 passes through the second pipeline 27a. Since the desiccant sprayed thus is cooled down to be in a low temperature state, the desiccant absorbs moisture from the room air during the desiccant falls down to the lower part.

Thus, though the desiccant D2 of the second space 22 absorbs the moisture from the air, and heat exchanges with the air so as to be heated slightly, the desiccant D2 is cooled down at the second heat exchanger 32 again. Then, the moisture absorbed to the desiccant D2 passes through the semipermeable membrane to come into the first space 21.

Thus, when the cooling/heating system of air conditioner is operated in the ventilation and heating mode, wet warm air is discharge to the room, and the room is ventilated as the external air is discharged into the room.

Next, the dedicated ventilation mode operation of the cooling/heating system will be described.

In this case, though the first and second fans 25 and 26 are operated, the heat pump system is not operated. The first and second pumping systems may or may not be operated depending on a user's desired condition of air.

Upon putting the first and second fans 25 and 26 into operation, the external air drawn into the first passage 11 is introduced into the first space 21 through the regenerative heat exchanger 13, and the room air drawn into the second passage 12 is introduced into the second space 22 through the regenerative heat exchanger.

In this process, the external air and the room air heat exchange indirectly at the regenerative heat exchanger 13. In this instance, a portion of the thermal energy can be recovered from the room air.

Then, the external air is discharged into the room through the air outlet 23, and the room air is discharged to exterior through the air outlet 23a.

Therefore, even if the cooling/heating system of air conditioner is operated in the dedicated ventilation mode, there is no rapid room temperature rise or fall because a portion of thermal energy is recovered from the room air. At the end, the power consumption is small even if the room is cooled/heated again.

The dedicated ventilation mode operation may be carried out intermittently during the ventilation and cooling/heating mode, or independently.

As has been described, the cooling/heating system of the air conditioner has the following advantages.

First, in cooling/heating a room, ventilation and cooling/heating can be carried out at the same time by discharging external air into the room. Therefore, even if the room is cooled/heated for a long time, the room air can be kept clean with a proper humidity.

Second, when the cooling/heating system is operated in the dedicated ventilation mode, the recovery of a portion of thermal energy from the room air prevents the room temperature from dropping significantly. Therefore, heat loss can be reduced significantly compared to the ventilation through an opened window.

Third, since the external air is cooled or heated as the external air passes through the regenerative heat exchanger and the desiccant, and further cooled or heated as the external air passes through the first heat exchanger, the cooling/heating performance can be improved even if the same capacity of first heat exchanger is employed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A cooling/heating system of air conditioner comprising:
    a duct having a first passage that draws external air, and a second passage that draws room air, the second passage having a part crossed with the first passage;
    a regenerative heat exchanger having first and second flow passages in the crossed part of the first and second passages for indirect heat exchange between the external air and the room air;
    a case connected to the first and second passages of the duct having first and second outlets that draw/discharge external and room air;
    first and second fans that draw in the external air and the room air into the case through the first and second passages, and draw the external air and the room air through the first and second outlets; and
    first and second heat exchangers for heat exchange with the external air and the room air discharge through the first and second outlets,
    wherein the case comprises first and second spaces formed therein divided with a semipermeable membrane for permeation of moisture only, the first and second spaces being filled with desiccant; and
    first and second pumping systems connected between upper parts and lower parts of the spaces that pump the desiccant to the upper parts of the spaces, respectively.

2. The cooling/heating system as claimed in claim 1, wherein the first and second fans are mounted between respective passages and outlets.

3. The cooling/heating system as claimed in claim 2, wherein the fans are mounted in the case.

4. The cooling/heating system as claimed in claim 1, wherein the first and second heat exchangers are mounted opposite to the first and second outlets of the case.

5. The cooling/heating system as claimed in claim 1, wherein the desiccant is silica gel.

6. The cooling/heating system as claimed in claim 1, wherein the first and second pumping systems are mounted so as to be respectively in contact with the first and second heat exchangers thermally.

7. The cooling/heating system as claimed in claim 6, wherein the first and second pumping systems comprises;
    first and second pipelines connected between the upper parts and lower parts of the first and second spaces to form flow passages of the desiccant and to be in contact with the first and second heat exchangers thermally, and
    first and second pumps on respective pipelines that pump the desiccant to the upper parts.

8. The cooling/heating system as claimed in claim 7, wherein the first and second pumping systems are mounted on upper parts of the first and second pipelines.

9. The cooling/heating system as claimed in claim 1, wherein the first space is in communication with the first passage that draws the external air, and the second space is in communication with the second passage that draws the room air.

10. The cooling/heating system as claimed in claim 1, wherein the first and second outlets are formed, and the first and second passages of the duct are connected to parts, above the level of the desiccant filled in the first and second spaces.

11. The cooling/heating system as claimed in claim 10, wherein the first and second fans are mounted between the first and second passages of the duct and the first and second outlets.

12. The cooling/heating system as claimed in claim 1, wherein the regenerative heat exchanger comprises the first flow passages and the second flow passages stacked alternately.

13. The cooling/heating system as claimed in claim 12, wherein the regenerative heat exchanger comprises;
    a plurality of corrugated plates stacked to cross each other alternately to form the first flow passages and the second flow passages, and
    a flat plate between adjacent corrugated plates that separate the first and second flow passages.

14. The cooling/heating system as claimed in claim 13, wherein the first flow passage is in communication with the first passage, and the second flow passage is in communication with the second passage.

15. The cooling/heating system as claimed in claim 1, wherein the first and second heat exchangers of the heat pump system are mounted opposite to the first and second outlets of the case.

16. A cooling/heating system of air conditioner comprising:
    a duct having a first passage that draws external air, and a second passage that draws room air, the second passage having a part crossed with the first passage;
    a regenerative heat exchanger having first and second flow passages in the crossed part of the first and second passages for indirect heat exchange between the external air and the room air;
    a case connected to the first and second passages of the duct having first and second outlets that draw/discharge external and room air;
    first and second fans that draw in the external air and the room air into the case through the first and second passages, and draw the external air and the room air through the first and second outlets; and
    first and second heat exchangers for heat exchange with the external air and the room air discharge through the first and second outlets.
    wherein the regenerative heat exchanger comprises the first flow passages and the second flow passages stacked alternately, and the first and second flow passages are formed of aluminum.

17. A cooling/heating system of air conditioner comprising:
    a duct having a first passage that draws external air, and a second passage that draws room air, the second passage having a part crossed with the first passage;
    a regenerative heat exchanger having first and second flow passages in the crossed part of the first and second passages for indirect heat exchange between the external air and the room air;
    a case connected to the first and second passages of the duct having first and second outlets that draw/discharge external and room air;
    first and second fans that draw in the external air and the room air into the case through the first and second passages; and draw the external air and the room air through the first and second outlets; and
    first and second heat exchangers for heat exchange with the external air and the room air discharge through the first and second outlets,
    wherein the regenerative heat exchanger comprises:
    the first flow passages and the second flow passages stacked alternately,
    a plurality of corrugated plates stacked to cross each other alternately to form the first flow passages and the second flow passages, and
    a flat plate between adjacent corrugated plates that separate the first and second flow passages.

18. The cooling/heating system as claimed in claim 17, wherein the first flow passage is in communication with the first passage, and the second flow passage is in communication with the second passage.

* * * * *